United States Patent
Hu et al.

(10) Patent No.: US 10,044,204 B2
(45) Date of Patent: Aug. 7, 2018

(54) POWER SOURCE ADAPTOR FOR CHARGING DIRECTLY

(71) Applicant: HISENSE MOBILE COMMUNICATIONS TECHNOLOGY CO., LTD., Qingdao (CN)

(72) Inventors: Ermeng Hu, Qingdao (CN); Wenjuan Du, Qingdao (CN); Liangliang Xu, Qingdao (CN)

(73) Assignees: HISENSE MOBHE COMMUNICATIONS TECHNOLOGY CO., LTD., Qingdao (CN); HISENSE USA CORPORATION, Suwanee, GA (US); HISENSE INTERNATIONAL CO., LTD., Qingdao (CN)

( * ) Notice: Subject to any disclaimer, the term of this patent is extended or adjusted under 35 U.S.C. 154(b) by 160 days.

(21) Appl. No.: 15/064,835

(22) Filed: Mar. 9, 2016

(65) Prior Publication Data

US 2017/0040813 A1 Feb. 9, 2017

(30) Foreign Application Priority Data

Aug. 5, 2015 (CN) .......................... 2015 1 0473365

(51) Int. Cl.
  *H02J 7/00* (2006.01)
  *H02J 7/02* (2016.01)

(52) U.S. Cl.
  CPC ............ *H02J 7/0044* (2013.01); *H02J 7/022* (2013.01)

(58) Field of Classification Search
  CPC ...................................................... H02J 7/0044
  USPC ............................................................ 320/114
  See application file for complete search history.

(56) References Cited

U.S. PATENT DOCUMENTS

| | | | | |
|---|---|---|---|---|
| 9,362,773 | B2 * | 6/2016 | Tuli | ...................... G06F 1/1632 |
| 9,647,474 | B2 | 5/2017 | Fathollahi et al. | |
| 9,812,878 | B1 * | 11/2017 | Stieber | .................. H02J 7/0021 |
| 2006/0149855 | A1 | 7/2006 | Fukuda | |
| 2008/0291879 | A1 | 11/2008 | Duff et al. | |

(Continued)

FOREIGN PATENT DOCUMENTS

| | | |
|---|---|---|
| CN | 102684268 A | 9/2012 |
| CN | 103066340 A | 4/2013 |

(Continued)

OTHER PUBLICATIONS

Office Action from corresponding Chinese Application No. 201510473365.0, dated Jun. 13, 2017 (3 pages).

(Continued)

*Primary Examiner* — Suchin Parihar
(74) *Attorney, Agent, or Firm* — Harness, Dickey & Pierce P.L.C.

(57) ABSTRACT

The application discloses a power source adaptor for charging directly, where the power source adaptor for charging directly is timed to communicate wirelessly with a mobile terminal which is a charging object, to obtain a change in voltage of a battery in the mobile terminal, adjusts dynamically a volt value of charging voltage output by the power source adaptor for charging directly according to the varying voltage of the battery, and charges directly the battery in the mobile terminal using the charging voltage.

14 Claims, 7 Drawing Sheets

(56) References Cited

U.S. PATENT DOCUMENTS

| | | |
|---|---|---|
| 2011/0309789 A1* | 12/2011 | Prasad ............... H02J 7/0052 320/107 |
| 2012/0212203 A1 | 8/2012 | Harrison |
| 2013/0197748 A1 | 8/2013 | Whitaker |
| 2014/0139046 A1 | 5/2014 | Chowdary et al. |
| 2014/0341318 A1 | 11/2014 | Pourkhaatoun et al. |
| 2015/0008749 A1 | 1/2015 | Rhee |
| 2015/0194833 A1 | 7/2015 | Fathollahi et al. |
| 2016/0197732 A1 | 7/2016 | Burnett |
| 2017/0010659 A1 | 1/2017 | Park et al. |
| 2017/0040810 A1 | 2/2017 | Hu et al. |
| 2017/0040813 A1 | 2/2017 | Hu et al. |

FOREIGN PATENT DOCUMENTS

| | | |
|---|---|---|
| CN | 103354376 A | 10/2013 |
| CN | 203747485 U | 7/2014 |
| CN | 104253456 A | 12/2014 |
| CN | 104393627 A | 3/2015 |
| CN | 104796011 A | 7/2015 |
| CN | 103236568 B | 3/2016 |
| EP | 1094587 A1 | 4/2001 |
| JP | 2001142837 A | 5/2001 |
| JP | 2007267498 A | 10/2007 |

OTHER PUBLICATIONS

Office Action from Chinese Application No. 201510473396.6 dated Jan. 13, 2017 (7 pages).
Office Action from Chinese Application No. 201510473330.7 dated Dec. 30 2016 (11 pages).
Office Action from Chinese Application No. 201510473330.7 dated Jul. 25, 2017 (3 pages).
Office Action from Chinese Application No. 201510473330.7 dated Nov. 24, 2017 (4 pages).

* cited by examiner

POWER SOURCE ADAPTOR FOR CHARGING DIRECTLY

CROSS-REFERENCE TO RELATED APPLICATION

This application claims the benefit and priority of Chinese Patent Application No. 201510473365.0 filed Aug. 5, 2015. The entire disclosure of the above application is incorporated herein by reference

FIELD

The present disclosure relates to the field of Direct-Current (DC) charging and particularly to a power source adaptor for charging rapidly a battery in a mobile terminal, and a mobile terminal.

BACKGROUND

This section provides background information related to the present disclosure which is not necessarily prior art.

At present, portable electronic products (or mobile terminals) have been widely applied in numerous aspects of people's life, and have become a leading factor in the development of the semiconductor industry. Moreover more and more types of portable electronic products are emerging, e.g., MP3, MP4, PMP, MID, mobile TV terminals, tablet computers, etc., along with the constant development of sciences and technologies, and these portable electronic products can provide audio and video playing, and other entertainment functions, and also provide navigation, an access to the Internet, business, disease diagnosis, and other service functions to thereby greatly facilitate people's life.

For the sake of portability, the portable electronic products are generally provided with chargeable batteries built in the products to power system circuits in the products. As an increasing number of functions supported by the portal electronic products are emerging, their system circuits also consume more and more power, the products operate for a shorter and shorter period of time after the batteries are charged with a limited capacity of the batteries, so that the batteries have to be charged more and more frequently.

SUMMARY

This section provides a general summary of the disclosure, and is not a comprehensive disclosure of its full scope or all of its features.

An embodiment of the application provides a power source adaptor for charging directly comprising a charging interface, an AC to DC converting unit, a wireless communication module, and a controlling unit, wherein the charging interface is configured to be externally connected with a mobile terminal, and including a power source pin and a ground pin; the AC to DC converting unit is configured to convert an AC input power source into charging voltage required for the mobile terminal, and to output the charging voltage via the charging interface; the wireless communication module is configured to transmit and receive a wireless signal; and the controlling unit connected with the wireless communication module is configured to start the wireless communication module to wait for being connected wirelessly with the mobile terminal, after the AC to DC converting unit receives the AC input power source or the charging interface is connected with the mobile terminal; and after they are connected successfully, to exchange data with the mobile terminal through the wireless communication module, and to adjust the charging voltage output by the AC to DC converting unit according to current voltage of a battery of the mobile terminal.

An embodiment of the application provides mobile terminal including a battery, a USB interface, a wireless communication module, a direct charging switch, a power source managing chip, and a microprocessor, wherein the battery is configured to store electrical energy; the USB interface is configured to be engaged with an external device; the wireless communication module is configured to transmit and receive a wireless signal; the microprocessor is configured, upon detecting an external device being plugged into the USB interface, to start the wireless communication module to search for devices which can communicate wirelessly therewith, if the devices include the external device connected with the USB interface, to determine that the external device is a power source adaptor for charging directly, and to be connected wirelessly with the power source adaptor for charging directly, if they are connected successfully, to exchange data with the power source adaptor for charging directly through the wireless communication module, to detect voltage of the battery, and if the voltage of the battery lies in a range delimited by preset direct charging threshold, to control charging voltage output by the power source adaptor for charging directly to charge the battery directly, and to determine the value of the charging voltage output by the power source adaptor for charging directly according to the current voltage of the battery, and the microprocessor is further configured to output a switch control signal; and the direct charging switch is configured to control the mobile terminal to be switched between a charging mode in which the battery is charged through the power source managing chip, and a charging mode in which the battery is charged through the direct charging switch, in response to the switch control signal output by the microprocessor.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

This application proposes a power source adaptor for charging directly outputting dynamically adjustable voltage to address such a problem that if a mobile terminal in which a chargeable battery is built is charged using a normal power source adaptor, then charging voltage output by the normal power source adaptor will be constant, and charging current has to be controlled by a power source managing chip not to be too high, typically below 1.5 A, so it may take a long period of time to charge the drained battery until the battery is fully charged. The power source adaptor for charging directly exchanges data with the mobile terminal in a wireless communication mode, adjust duly a voltage value of the charging voltage output by the power source adaptor for charging directly according to a change in voltage of the battery being charged, and charge the battery in the mobile terminal directly using the dynamically varying charging voltage, so that the charging current can be maintained at a higher current value, typically up to approximately 4 A, and the battery can be charged directly at the larger current to thereby significantly speed up charging and greatly shorten the period of time for charging.

Firstly hardware configurations of the power source adaptor for charging directly and the mobile terminal which can be charged by the power source adaptor for charging directly will be described below.

Figure 1:
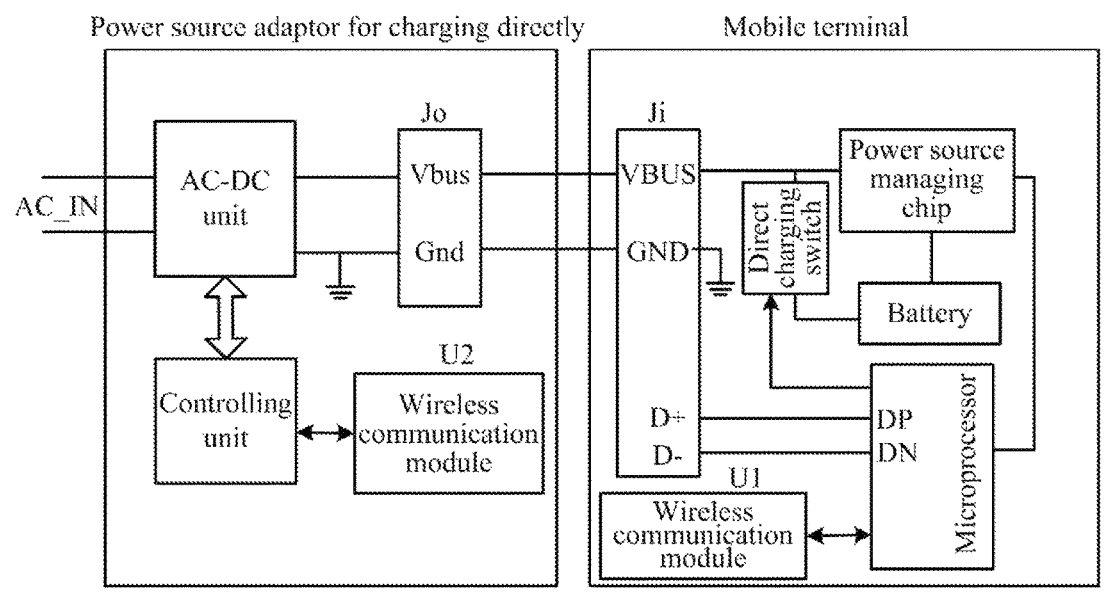
FIG. 1 is a circuit scheme block diagram of an embodiment of a power source adaptor for charging directly connected with a mobile terminal according to this application.

As illustrated in FIG. 1, in order to maintain the existing traditional charging function of the mobile terminal so that the mobile terminal can be normally engaged with and charged by the existing host and the normal power source adaptor, the existing charging interface of the mobile terminal which can be charged by the power source adaptor for charging directly according to this embodiment can be maintained, that is, a reused interface for both charging and transmitting data can be maintained, e.g., a currently widely applied USB interface Ji, so that the mobile terminal can be engaged with and powered by the normal power source adaptor and the computer host in the market, which are currently manufactured by the majority of the manufactures. For the power pin VBUS in the USB interface Ji, in this embodiment, one branch thereof is connected with a power source managing chip in the mobile terminal, and another branch thereof is connected with the battery through a direct charging switch, which can be any type of controllable switch element with low conduction impedance through which large current can pass, e.g., controllable silicon, an MOS transistor, etc., to receive a switch control signal output by a microprocessor in the mobile terminal to selectively switch between the normal charging mode and the rapid charging mode. For the ground pin GND in the USB interface Ji, it can be well connected with system ground of the mobile terminal so that the mobile terminal can be grounded together with the external charging device if the mobile terminal is engaged with the external device. For differential data pins D+ and D− in the USB interface Ji, they are connected with differential data interfaces DP and DN of the microprocessor for communication with the externally connected host.

A wireless communication module U1, e.g., a Bluetooth module, a WiFi module, etc., is designed in the mobile terminal to be connected with the microprocessor, possibly with a branch of UART interfaces of the microprocessor, to transmit data over a serial asynchronous bus. The mobile terminal can communicate wirelessly with the power source adaptor for charging directly supporting wireless communication through the wireless communication module U1 to thereby adjust dynamically the charging voltage output by the power source adaptor for charging directly.

Figure 2:
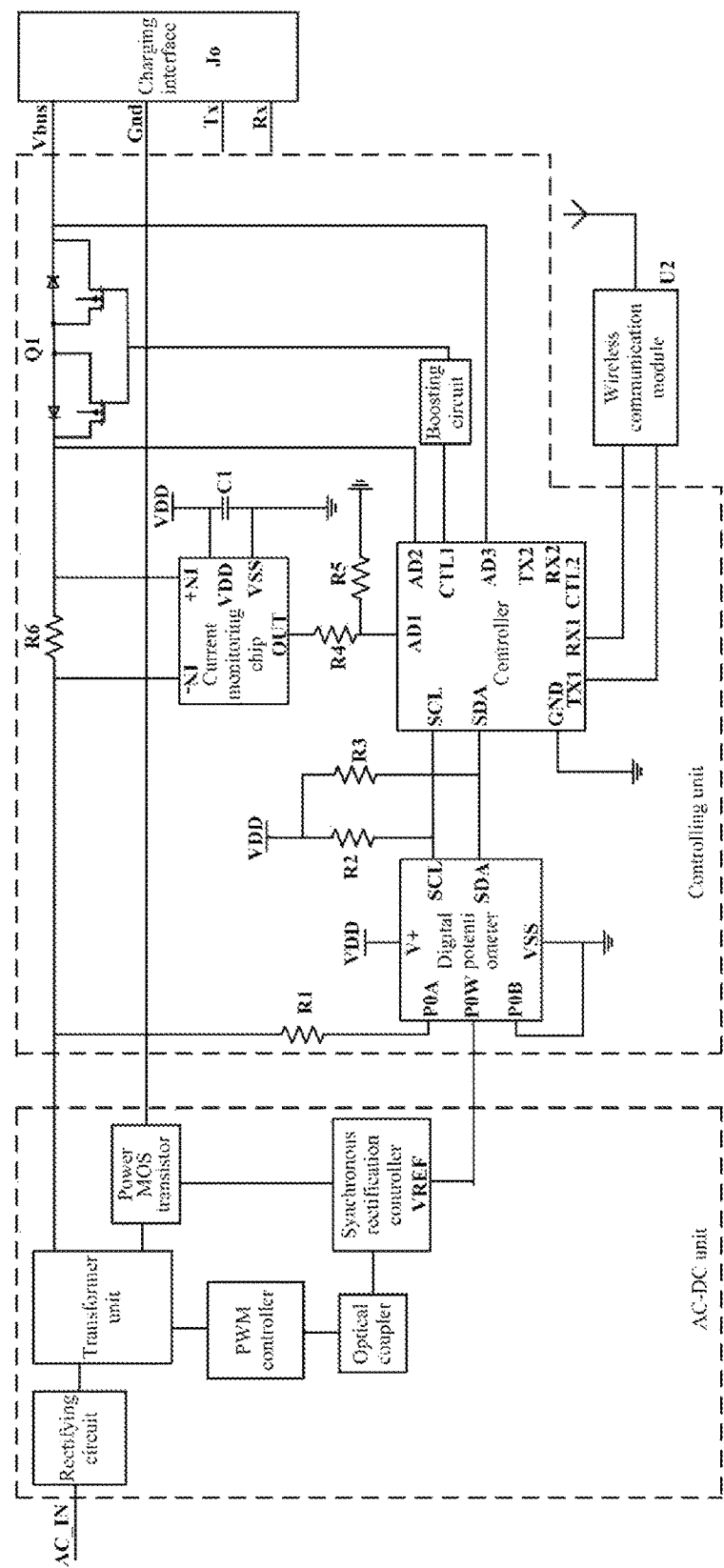
FIG. 2 is a particular circuit scheme diagram of an embodiment of the power source adaptor for charging directly in FIG. 1.

FIG. 2 illustrates a schematic diagram of circuitry components in the power source adaptor for charging directly supporting wireless communication in FIG. 1, where generally includes a charging interface Jo, a wireless communication module U2, a controlling unit, and an AC to DC converting unit (an AC-DC unit), as illustrated in FIG. 1 as well, where a power source pin Vbus and a ground pin Gnd are arranged in the charging interface Jo. The power source pin Vbus configured to transmit a charging power source is connected with the AC-DC unit to transmit a DC power source output by the AC-DC unit to the power source pin VBUS of the USB interface Ji of the mobile terminal to charge the mobile terminal. The ground pin Gnd is connected with the system ground of the power source adaptor for charging directly, and after the power source adaptor for charging directly is engaged with the mobile terminal, the ground pin Gnd is connected with the ground pin GND of the USB interface Ji of the mobile terminal so that both of the ground pins are grounded together. In order to enable the charging interface Jo to match and be engaged with the USB interface Ji of the mobile terminal, two configuration pins Tx and Rx configured to be respectively connected with the differential data pins D+ and D− in the USB interface Ji can be further configured in the charging interface Jo. The two configuration pins Tx and Rx can be designed to be shorted, or can be designed to be disconnected, where the two disconnected configuration pins Tx and Rx can float. For the two different configuration states, different strategies to identify the type of the external device will be designed at the mobile terminal side as described later in details.

In this embodiment, a rectifying circuit, a transformer unit, a synchronous rectification controller, a PWM controller, an optical coupler, a power MOS transistor, and other elements are designed in the AC-DC unit; and a controller, a digital potentiometer, a current monitoring chip, a boosting circuit, and other elements are designed in the controlling unit, as illustrated in FIG. 2, where the rectifying circuit receives an AC input power source AC_IN provided by a mains grid, rectifies the AC input power source into a DC power source, and outputs the DC power source to the transformer unit for transformation into the charging voltage to charge the mobile terminal. The controller has the UART interfaces TX1 and RX1 thereof connected with the wireless communication module U2 for wireless communication with the microprocessor in the mobile terminal to exchange a handshake instruction, and receives control information sent by the mobile terminal, upon the successful handshake to adjust dynamically the volt value of the charging voltage output by the AC-DC unit based on the varying voltage of the battery in the mobile terminal to thereby charge directly the battery built in the mobile terminal at large current.

The wireless communication module U2 can be embodied as a Bluetooth module, a WiFi module, etc., and the power source adaptor for charging directly can exchange data with the mobile terminal in the wireless communication mode, so that such a difference in ground level between the power source adaptor and the mobile terminal can be addressed that arises from a significant voltage drop across a charging line between the power source adaptor and the mobile terminal being charged at large current, where the difference in ground level would otherwise have degraded a quality of waveform of the communication signal, thus resulting in the instability of communication.

In order to adjust the output voltage of the AC-DC unit, in this embodiment, the digital potentiometer is designed in the controlling unit to be connected with the controller. The controller generates a voltage adjusting instruction based on the received control information, and sends the voltage adjusting instruction to the digital potentiometer to change the resistance value of a valid resistor of the digital potentiometer. In this embodiment, the controller can be connected and communicate with the digital potentiometer preferably over an I$^2$C bus, as illustrated in FIG. 2, to transmit the voltage adjusting instruction. In order to ensure the stability of the signal being transmitted, in this embodiment, a voltage pull-up circuit is further connected over the I$^2$C bus, for example, a clock line SCL and a data line SDA of the I$^2$C bus are connected with a DC power source VDD respectively through pull-up resistors R2 and R3 to thereby improve the anti-interference capability of the signal being transmitted.

The DC power source VDD can be embodied as a set of small electromagnetic coils designed separately in the transformer unit. The turn ratio of a primary coil and a secondary coil in the set of small electromagnetic coils is configured to transform the voltage of the DC power source output by the rectifying circuit into the desirable DC power source VDD to supply power to those components needing DC operating voltage in the power source adaptor for charging directly, e.g., the controller, the digital potentiometer, the current detecting chip, and other components to thereby enable them to operate as desired.

The digital potentiometer is a resistance-adjustable resistor element in which a resistor body is built. In this embodiment, the resistor body connected in series with a current-limiting resistor R1 is connected between the anode of a secondary coil in another set of electromagnetic coils (referred below simply to as the other set of electromagnetic coils) in the transformer unit and the ground. One end P0A of the resistor body can be connected with the anode of the secondary coil in the other set of electromagnetic coils through the current-limiting resistor R1 connected in series, and the other end P0B of the resistor body can be grounded. A central tap P0W of the resistor body is connected with a reference voltage pin VREF of the synchronous rectification controller, and if the resistance value of the valid resistor of the digital potentiometer varies, then the volt value of the charging voltage output by the other set of electromagnetic coils in the transformer unit will be adjusted in order to maintain the reference voltage on the reference voltage pin VREF of the synchronous rectification controller. In order to adjust the volt value of the charging voltage, the synchronous rectification controller adjusts its output control signal according to the varying resistance value of the valid resistor of the digital potentiometer, and transmits the control signal to the PWM controller after the control signal is optic-electrically isolated by the optical coupler, to thereby adjust a duty ratio of a PWM signal output by the PWM controller. Particularly the PWM signal is transmitted to the transformer unit, and particularly can be transmitted to a switch transistor connected in series with the secondary coil in the other set of electromagnetic coils, to control the switch transistor to be switched on and off to thereby adjust the switching timing of the other set of electromagnetic coils so as to further adjust the volt value of the charging voltage output by the secondary coil thereof for the purpose of adjusting dynamically the charging voltage.

In this embodiment, the charging voltage output by the transformer unit can be finely adjusted in the range of 3.6V to 12V to thereby charge different mobile terminals as required in reality.

In order to achieve the stability of the charging voltage output by the transformer unit, in this embodiment, instead of a traditional rectification scheme in which a diode is connected in series on a charging voltage transmission line, the power MOS transistor is connected on the charging voltage transmission line and switched on or off by the switching signal output by the synchronous rectification controller to thereby shape the waveform of the charging voltage output by the transformer unit.

In this embodiment, the power MOS transistor is preferably embodied as an NMOS transistor connected between the cathode of the secondary coil in the other set of electromagnetic coils and the ground pin Gnd of the charging interface Jo. Since the power source adaptor for charging directly supports an output of large current, if the charging voltage output by the transformer unit is shaped by the diode, then power consumption of the power source adaptor for charging directly may be increased and the efficiency in charging may be lowered due to a significant voltage drop across the conducting diode. In this embodiment, the charging voltage is shaped by the power MOS transistor, and since the power MOS transistor has low inner resistance and supports large current passing, systematic power consumption of the power source adaptor for charging directly can be lowered effectively and the efficiency in charging the mobile terminal can be improved.

In order to monitor in real time charging current output by the transformer unit to thereby improve the safety in charging, in this embodiment, a current monitoring unit is further arranged in the power source adaptor for charging directly to monitor in real time charging current $I_{chg}$ output via the charging interface Jo, and to feed the charging current back to the controller. From the received magnitude of the charging current, the controller can both determine whether the charging interface Jo is connected with the mobile terminal (if not, then the charging current output via the charging interface Jo will be zero), and take a necessary protection measure, for example, disconnect the charging current from being output, to thereby protect the power source adaptor for charging directly and the mobile terminal, upon detecting abnormality of the charging current.

The current monitoring unit can further include a sample resistor R6 and a current monitoring chip as illustrated in FIG. 2. The sampling resistor R6 is connected in series in a transmission line of the charging current, and preferably between the anode of the secondary coil in the other set of electromagnetic coils in the transformer unit and the power source pin Vbus of the charging interface Jo. Inputs −IN and +IN of the current monitoring chip are connected with two ends of the sampling resistor R6 to acquire a voltage drop across the sampling resistor R6, and after the voltage drop is amplified, the magnitude of the charging current is calculated from the voltage drop and the resistance value of the sampling resistor R6. The current monitoring chip generates sample voltage corresponding to the calculated magnitude of the charging current according to the calculated magnitude of the charging current, and transmits the sample voltage to an ADC interface AD1 of the controller through an output OUT thereof, and the sample voltage is analog-to-digital converted by the controller into the magnitude of the charging current, so the controller can monitor in real time the charging current.

If the range of the amplitude of the sample voltage output by the current monitoring chip exceeds an interface voltage range specified by the ADC interface AD1 of the controller, then the ADC interface of the controller may be damaged. In order to protect the controller, an bleeder circuit can be additionally arranged between the output OUT of the current monitoring chip and the ADC interface AD1 of the controller, e.g., a resistor bleeder circuit composed of resistors R4 and R5, to adjust the voltage signal output by the current monitoring chip within the interface voltage range acceptable to the AD1 interface of the controller so as to avoid the ADC interface AD1 of the controller from being damaged due to the input voltage being too high.

In order to improve the safety in charging so that the power source adaptor for charging directly can have the charging power source disconnected rapidly upon abnormal charging occurring to thereby avoid the mobile terminal from being damaged, in this embodiment, a switch transistor Q1 supporting large current passing is further arranged in the charging power source transmission line of the power source adaptor for charging directly so that a switch voltage, generated by the boosting circuit, sufficient to drive the switch transistor Q1 to be switched on is transmitted to a control pole of the switch transistor Q1 to control the switch transistor Q1 to be switched on or off to thereby have the charging power source transmission line connected or disconnected.

In this embodiment, the switch transistor is preferably embodied as a pair of NMOS transistors Q1 in which parasitic diodes connected in anti-parallel are built, as illustrated in FIG. 2. The pair of NMOS transistors Q1 are switched on and connected in series in the transmission line of the charging power source, where the source electrodes of the two NMOS transistors in the pair of NMOS transistors Q1 can be connected, the drain electrodes of the two NMOS transistors can be connected respectively with the anode of the secondary coil in the other set of electromagnetic coils in the transformer unit, and the power source pin Vbus of the charging interface Jo; and then the gate electrodes of the two NMOS transistors can be connected with the boosting circuit. An enable terminal of the boosting circuit is connected with the controller to receive an enable signal output by the controller. During charging, if the controller detects normal charging current, then the controller will output the valid enable signal to control the boosting circuit to be enabled into operation to boost the DC power source output by the transformer unit to the switch voltage higher than the volt value of the charging voltage, and the switch voltage is output to the gate electrodes of the pair of NMOS transistors Q1 to control the pair of NMOS transistors Q1 to be switched on to have the transmission line of the charging power source connected, so that the charging power source can be output to the externally connected mobile terminal to charge the battery in the mobile terminal. If the controller detects abnormal charging current or receives control information sent by the mobile terminal to stop charging, then the controller will output the invalid enable signal to control the boosting circuit to stop operating. At this time the pair of NMOS transistors Q1 is switched off due to the disappearing voltage at the gate electrodes thereof, to thereby have the transmission line of the charging power source disconnected to block the charging power source from outputting to the outside, so that the power source adaptor for charging directly can be controlled to stop supplying power to the mobile terminal.

At the mobile terminal side, in order to enable the mobile terminal in which the chargeable battery is built, to identify automatically and accurately the type of the currently inserted external device so as to invoke different charging management modes according to different charging characteristics of different external devices to thereby make reasonable use of charging resources, this embodiment proposes a charging method as described below for the host and the normal power source adaptor, and the power source adaptor for charging directly according to this embodiment in addition to the circuitry adaptations as illustrated in FIG. 1 to the hardware configuration of the mobile terminal.

Figure 3:
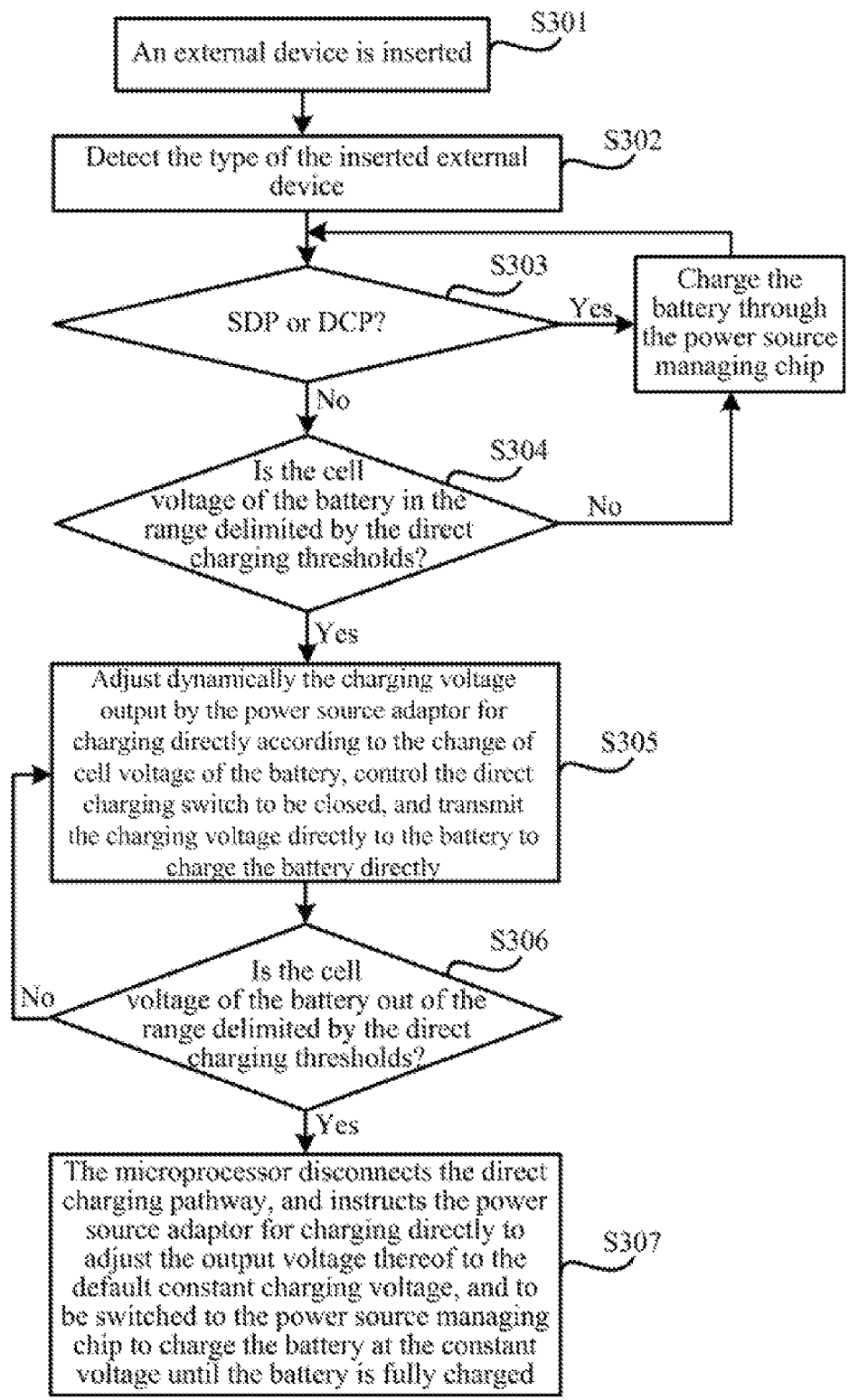
FIG. 3 is a flow chart of a process of a charging method designed for the mobile terminal illustrated in FIG. 1.

As illustrates in FIG. 3, the charging method generally involves the following steps:

S301. The mobile terminal detects whether an external device is inserted, and performs subsequent steps upon detecting an external device being inserted.

In this embodiment, whether an external device being inserted can be detected as in the prior art, for example, by detecting whether a DC power source accessing the power source pin VBUS of the USB interface Ji of the mobile terminal. In the traditional host charging mode SDP and normal power source adaptor charging mode DCP, the charging voltage output by the host and the normal power source adaptor is typically 5V; and the power source adaptor for charging directly can be configured to output by default the same constant charging voltage as the host and the normal power source adaptor, e.g., 5V constant charging voltage so that the mobile terminal can substantially determine whether the power source adaptor for charging directly is inserted.

Of course the 5V constant charging voltage here only relates to an embodiment, and for some mobile terminal to be charged at constant voltage of another volt value, the power source adaptor for charging directly will be simply configured to output by default the same constant charging voltage as the charging voltage output by the normal power source adaptor when the normal power source adaptor supplies power to the mobile terminal.

S302. The mobile terminal detects the type of the inserted external device.

In this embodiment, the mobile terminal operates by default without being charged directly, that is, the microprocessor in the mobile terminal controls by default the direct charging switch to be opened to have the power source pin VBUS of the USB interface Ji connected with the power source managing chip.

Whether the inserted external device is the host or the normal power source adaptor can be determined as in the existing BC1.2 charging type detection scheme. Of course this can alternatively be determined particularly as follows:

(1) If the two configuration pins Tx and Rx in the charging interface Jo of the power source adaptor for charging directly are disconnected from each other, then:

If the mobile terminal detects an external device being inserted into the charging interface thereof, then the microprocessor firstly determines whether the differential data pins D+ and D− thereof are shorted, and if so, then the mobile terminal determines that the inserted external device is the normal power source adaptor because the communication pins of the existing normal power source adaptor typically are configured to be shorted; otherwise, the mobile terminal communicates with the external device by USB through the microprocessor, and if the communication succeeds, then the mobile terminal determines that the inserted external device is the host because the existing host (particularly the computer host) typically is connected and communicates with and supplies power to the mobile terminal through the USB data line; otherwise, the inserted external device may be the power source adaptor for charging directly.

In order to determine whether the inserted external device is the power source adaptor for charging directly, the microprocessor firstly starts the wireless communication module U1 to search for devices which can communicate wirelessly therewith, and if the found devices include the external device connected with the USB interface Ji of the mobile terminal, then the microprocessor determines that the external device is the power source adaptor for charging directly. Then the microprocessor communicates wirelessly with the power source adaptor for charging directly through the wireless communication module U1, and if the communication succeeds, then the mobile terminal enters the charging mode; otherwise, the microprocessor will not start the charging mode or can further output an alert of "Inserted Device Can Not Be Identified".

(2) If the two configuration pins Tx and Rx in the charging interface Jo of the power source adaptor for charging directly are shorted, then:

If the mobile terminal detects an external device being inserted into the charging interface thereof, then the microprocessor firstly determines whether the differential data pins D+ and D− thereof are shorted, and if not, then the microprocessor determines that the inserted external device is the host; otherwise, the microprocessor determines that the inserted external device is a power source adaptor. In order to determine the particular type of the inserted power source device, the microprocessor starts the wireless communication module U1 to search for devices which can communicate wirelessly therewith, and if the found devices include the external device connected with the USB interface Ji of the mobile terminal, then the microprocessor determines that the external device is the power source adaptor for charging directly; otherwise, the microprocessor determines that the inserted device is the normal power source adaptor.

If it is determined that the external device inserted into the USB interface Ji of the mobile terminal is the power source adaptor for charging directly, then the microprocessor communicates wirelessly with the power source adaptor for charging directly through the wireless communication module U1, and if the communication succeeds, then the mobile terminal enters the charging mode; otherwise, the microprocessor will not start the charging mode.

In a preferred implementation of this embodiment, preferably the mobile terminal communicates wirelessly with the power source adaptor for charging directly in a Bluetooth mode, that is, the wireless communication modules U1 and U2 are embodied as Bluetooth modules so that the mobile terminal exchanges data with the power source adaptor for charging directly in the following process:

After there is a detected external device inserted into the USB interface Ji of the mobile terminal, if the mobile terminal needs to further determine whether the inserted external device is the power source adaptor for charging directly, then the microprocessor starts the Bluetooth module to search for external Bluetooth devices. In order to enable the power source adaptor for charging directly to be found by the mobile terminal, the Bluetooth module U2 in the power source adaptor for charging directly is designed to run automatically on power-on after the power source adaptor for charging directly is connected with an external AC input power source or the mobile terminal is connected with the charging interface Jo. Particularly the controlling unit in the power source adaptor for charging directly can be designed to be powered on and run directly after the power source adaptor for charging directly is connected with the AC input power source. After the controlling unit becomes stable in operation, the controlling unit starts automatically the Bluetooth module U connected therewith, or after the controlling unit detects that the external mobile device is connected with the charging interface Jo of the power source adaptor, the controlling unit controls the Bluetooth module U2 connected therewith to be started and to wait for being paired and connected with the external mobile terminal.

There may be a number of different types of Bluetooth devices, e.g., a Bluetooth earphone, a Bluetooth sound box, a Bluetooth enabled cell phone, a power source adaptor for charging directly supporting Bluetooth communication, etc., nearby the mobile terminal. During the course of searching for the external Bluetooth devices, the mobile terminal creates a list of devices including the found Bluetooth devices, and provides the list of devices to the user for selecting one of the Bluetooth devices to be paired. If the user selects the name of a device corresponding to the power source adaptor for charging directly connected with the mobile terminal, then the microprocessor in the mobile terminal sends a Bluetooth match code (or a Bluetooth PIN code) through the Bluetooth module U1 to request for matching with the power source adaptor for charging directly.

The power source adaptor for charging directly connected with the mobile terminal feeds the same Bluetooth match code back to the mobile terminal upon reception of the Bluetooth match code.

If the mobile terminal detects the same Bluetooth match code input by the power source adaptor for charging directly, which indicates successful matching, then the mobile terminal waits for a next connection operation; and if the power source adaptor for charging directly inputs a different Bluetooth match code, which indicates that this matching fails, then they can not be connected. This operation of matching the mobile terminal with the power source adaptor for charging directly can be considered as authentication between these two devices.

After the devices are matched successfully, the mobile terminal initiates a connection request on its own initiative to the power source adaptor for charging directly for being wirelessly connected with the power source adaptor for charging directly.

The power source adaptor for charging directly accepts the connection request of the mobile terminal, and after the mobile terminal and the power source adaptor for charging directly are connected successfully, they conduct Bluetooth communication to exchange with each other a control instruction, and respective parameters required for charging.

Figure 4:
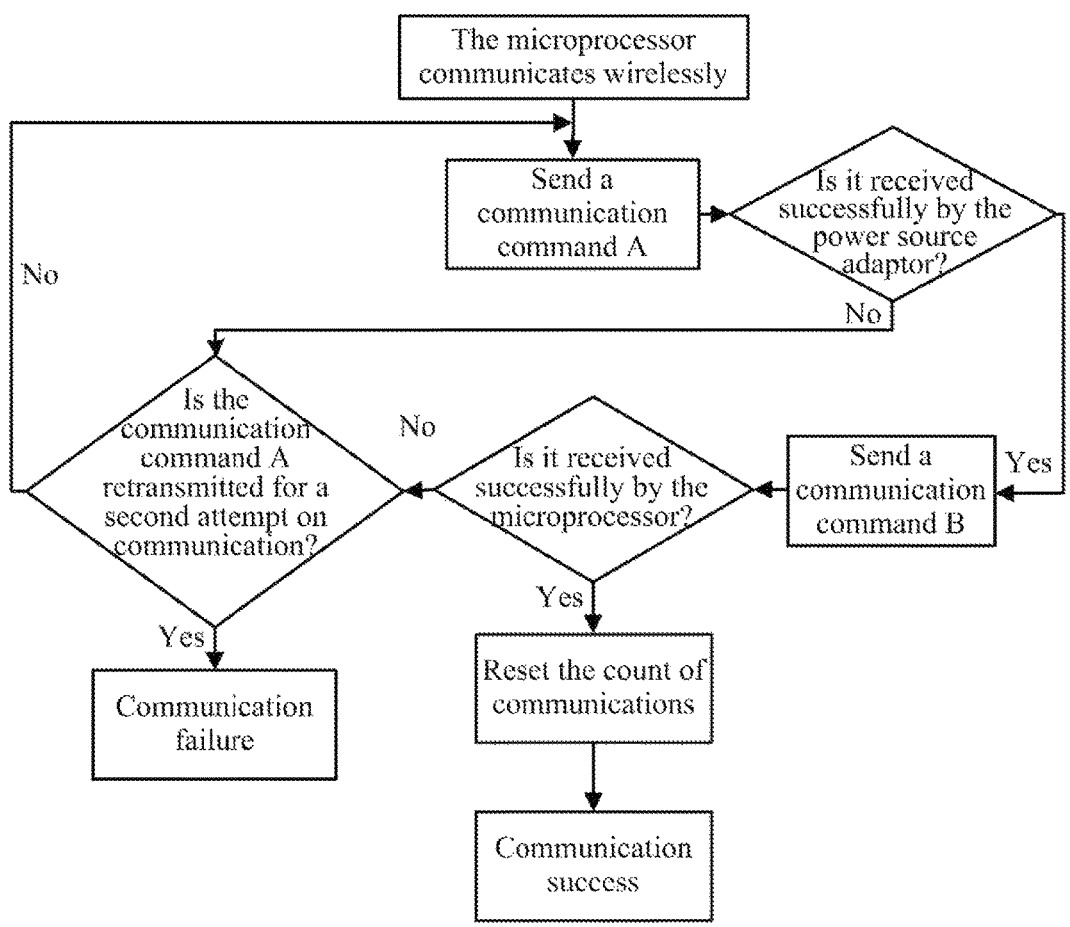
FIG. 4 is a flow chart of an embodiment of detecting communication between the mobile terminal and the power source adaptor for charging directly illustrated in FIG. 1.
Figure 5:
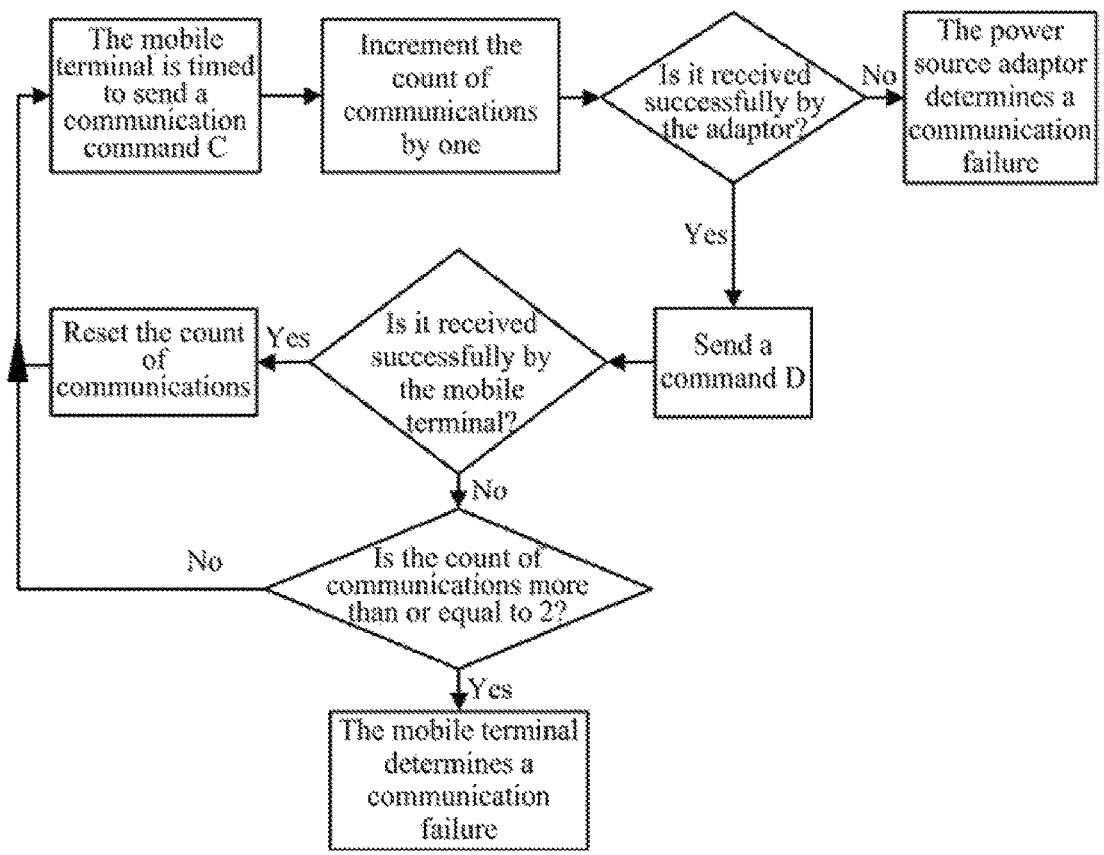
FIG. 5 is a flow chart of an embodiment of a timed detection mechanism of communication between the mobile terminal and the power source adaptor for charging directly illustrated in FIG. 1.

During wireless communication between the microprocessor and the power source adaptor, in order to achieve a better switching mechanism and error-tolerant mechanism, in this embodiment, communication between the mobile terminal and the power source adaptor for charging directly can be detected preferably in the following flow as illustrated in FIG. 4: the microprocessor initiates a communication command A on its own initiative to the external power source adaptor after starting the wireless communication module U1, and also counts the number of communications. The power source adaptor for charging directly receiving successfully the communication command A can respond accordingly by sending a communication command B to the mobile terminal, and if the mobile terminal does not receive any valid communication command B, then the microprocessor firstly determines the count of communications at that time, and if the count of communications is less than 2, then the microprocessor retransmits the communication command A for a second attempt on communication; and if the count of communications is more than or equal to 2, then the microprocessor determines that the communication fails. If the mobile terminal receives successfully the communication command B, then the microprocessor determines that the communication succeeds, and resets the count of communications, and thereafter starts a timed communication detecting mechanism as illustrated in FIG. 5.

In the timed communication detecting mechanism, the mobile terminal is timed to send a handshake instruction, e.g., a communication instruction C, to the power source adaptor for charging directly, and also increments the count of communications by one; and if the power source adaptor for charging directly receives successfully the communication instruction C, then it feeds immediately a response instruction back to the mobile terminal, for example, it sends a communication instruction D to the mobile terminal. If the mobile terminal receives successfully the communication instruction D, then the handshake succeeds, and the mobile terminal determines that the communication between them is normal, maintains the current charging process, resets the count of communications, and waits for arrival of a next timed detection period and then initiates again the communication instruction C. If the mobile terminal does not receive the communication instruction D, then the mobile terminal retransmits the communication instruction C to the power source adaptor for charging directly; and if both of the communications fail, then the mobile terminal determines that the power source adaptor for charging directly engaged therewith becomes abnormal. In order to ensure the safety of the mobile terminal, at this time the microprocessor has the connection line between the USB interface Ji of the mobile terminal and the internal system circuits thereof disconnected, and notifies the user of the abnormality of the externally connected power source adaptor to thereby alert the user.

S303. The mobile terminal enters a corresponding charging mode according to the detected type of the external device.

In this embodiment, if the inserted external device is detected as the host or the normal power source adaptor, then the battery is charged by the power source managing chip in the standard SDP charging mode (if the inserted external device is the host) or the standard DCP charging mode (if the inserted external device is the normal power source adaptor).

The microprocessor controls the direct charging switch to be kept in the default Off state, and also starts the power source managing chip to receive the charging voltage input by the host or the normal power source adaptor, and to enter different charging phases according to current cell voltage of the battery. By way of an example, for a 4.2V chargeable battery (4.2V cell voltage of the battery being fully charged), if the cell voltage is less than 3.5V, then the power source managing chip enters a small-current pre-charging phase in which 500 mA charging current is output, and the battery is pre-charged at the small current. If the cell voltage of the battery lies between 3.5V and 4.1V, then the power source managing chip enters a constant-current charging phase in which 1 A or 1.5 A charging current is output, and the battery is charged at the constant current. The battery is charged in the constant-current charging phase in the majority of the entire charging process, and typically it takes approximately 90% of the entire charging period of time for the cell voltage of the battery to rise from 3.5V to 4.1V. If the cell voltage of the battery rises above 4.1V, then the power source managing chip enters a constant-voltage charging phase in which constant voltage is output to charge the battery, and at this time the charging current is gradually decreased with the rising voltage of the battery until the battery is fully charged.

If the inserted external device is detected as the power source adaptor for charging directly, then the mobile terminal operates in a subsequent rapid charging mode.

S304. The mobile terminal determines whether the cell voltage of the battery lies in a range delimited by direct charging thresholds, and if so, then the mobile terminal performs a subsequent large-current direct charging process; otherwise, the battery is charged by the source power source managing chip.

In this embodiment, the direct charging thresholds (a lower voltage threshold S1 and an upper voltage threshold S2) can be determined particularly dependent upon the real condition of the battery to preferably agree with the voltage range of the battery corresponding to the constant-current charging phase in the normal DCP charging mode. For example, the lower voltage threshold S1 and the upper voltage threshold S2 of the 4.2V chargeable battery above can be set to S1=3.5V and S2=4.1V. If the cell voltage $V_{bat\_real}$ of the battery is $V_{bat\_real}<3.5V$ or $V_{bat\_real}>4.1V$, then the microprocessor controls the direct charging switch to be kept in the default Off state, and also starts the power source managing chip to receive the constant charging voltage input by the power source adaptor for charging directly, e.g., DC 5V charging voltage, to pre-charge the battery at small current (for $V_{bat\_real}<3.5V$) or at constant voltage (for $V_{bat\_real}>4.1V$), that is, the battery is charged in the same charging mode as the host and the normal power source adaptor. If the cell voltage $V_{bat\_real}$ of the battery is detected in the range [3.5V, 4.1V] delimited by the direct charging thresholds, then the mobile terminal enters the subsequent direct charging process.

S305. The mobile terminal communicates wirelessly with the power source adaptor for charging directly, adjusts dynamically the charging voltage output by the power source adaptor for charging directly according to the change of cell voltage of the battery, and controls the direct charging switch to be closed to short the power source managing chip so that the power source managing chip stops operating, and the charging voltage is transmitted directly to the battery to charge the battery directly.

In this embodiment, the charging voltage can be adjusted dynamically in any one of the following three preferred designed approaches:

In a first designed approach, a reference table of relationship between the cell voltage of the battery and the target charging voltage is preset in the mobile terminal, the cell voltage of the battery is detected, and the reference table is searched using the cell voltage for the target charging voltage corresponding to the cell voltage to control the voltage output of the power source adaptor for charging directly.

The cell voltage of the battery can be divided into several intervals according to the range [S1, S2] delimited by the preset direct charging thresholds, for example, the cell voltage is divided into N intervals at a step of 100 mV, where N=(S2−S1)/100 mV. For each interval, a target charging voltage value $V_{out}$, a target charging current value $I_{targ}$, and a charging current maximum value $I_{max}$ corresponding to the cell voltage in the interval are predetermined to create a reference table, and the reference table is stored in the microprocessor, or in a memory in the mobile terminal, connected with the microprocessor for being invoked by the microprocessor.

Figure 6:
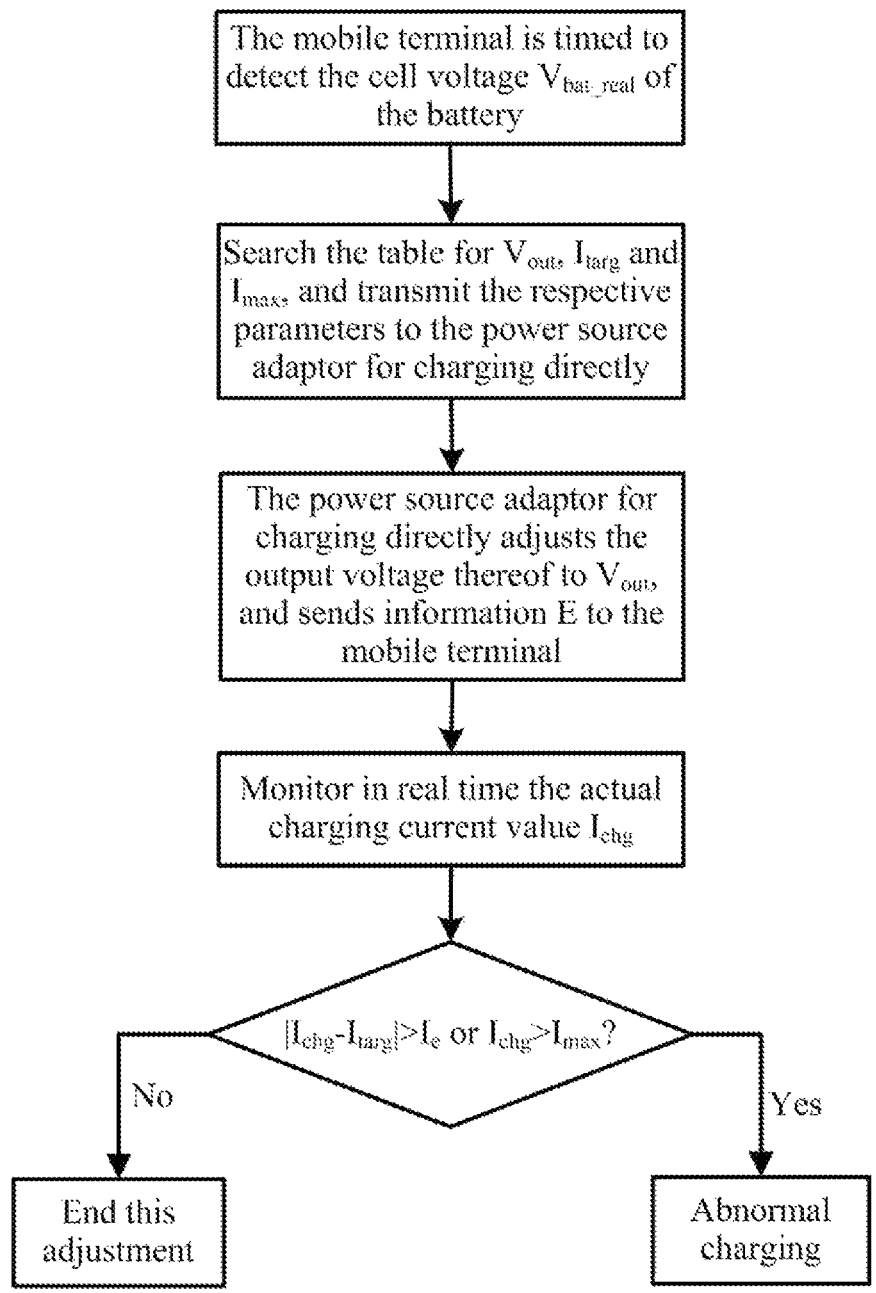
FIG. 6 is a flow chart of control in an embodiment of a direct charging control strategy using a lookup table.

After entering the direct charging process, as illustrated in FIG. 6, the microprocessor is timed to detect the cell voltage $V_{bat\_real}$ of the battery, searches the reference table using the detected cell voltage $V_{bat\_real}$, determines the cell voltage interval in which the cell voltage $V_{bat\_real}$ lies, and then searches using the determined interval for the target charging voltage value $V_{out}$, the target charging current value $I_{targ}$, and the charging current maximum value $I_{max}$ corresponding to the interval. Thereafter the microprocessor communicates wirelessly with the power source adaptor for charging directly, and sends the target charging voltage value $V_{out}$, the target charging current value $I_{targ}$, and the charging current maximum value $I_{max}$ to the power source adaptor for charging directly.

At the power source adaptor for charging directly side, the power source adaptor for charging directly adjusts the resistance value of the valid resistor of the digital potentiometer thereof according to the received target charging voltage value $V_{out}$ to thereby change the charging voltage output by the AC-DC unit thereof to the target charging voltage value $V_{out}$. At the end of the adjusting, the power source adaptor for charging directly sends information E to the mobile terminal, monitors in real time the actual charging current $I_{chg}$ output by the AC-DC unit, through the current monitoring chip, and if $|I_{chg}-I_{targ}|>I_e$ ($I_e$ represents a controllable range of the difference between the actual charging current value of the power source adaptor for charging directly and the target charging current value, and can be preferably set to $I_e=500$ mA in this embodiment), or $I_{chg}>I_{max}$, then the power source adaptor for charging directly determines abnormal charging. At this time in order to ensure the safety in charging, the power source adaptor for charging directly outputs the invalid enable signal through the controller therein, as illustrated in FIG. 2, to control the boosting circuit to stop the switch voltage from being output, and to further control the pair of MNOS transistors Q1 to be switched off to thereby block the charging power source output by the AC-DC unit from being transmitted to the mobile terminal. If $|I_{chg}-I_{targ}|\le I_e$ and $I_{chg}\le I_{max}$, then the power source adaptor for charging directly ends this adjusting process, and charges directly at large current the battery in the mobile terminal using the adjusted charging voltage, where the charging current here can rise beyond 3500 mA, to thereby significantly speed up charging.

The following scheme to create the reference table is proposed in this embodiment:

A number i of intervals, denoted as $x_{i1} \sim x_{i2}$, are set for the cell voltage in the range of $[S1, S2]$;

For each of the intervals $[x_{i1}, x_{i2}]$, a target charging voltage value $V_{out}$, a target charging current value $I_{targ}$, and a charging current maximum value $I_{max}$ corresponding to the interval are calculated respectively in the equations of:

$$V_{out}=V_{bat\_real}+I_{targ}*(R_{line}+R_{board}+R_{bat}) \quad (1)$$

$$I_{targ}=I_{max}-\Delta I \quad (2)$$

$$I_{max}=\min((V_{bat\_max}-V_{bat\_real})/R_{bat}, I_{allow}) \quad (3)$$

Where $R_{line}$ represents a resistance value on the charging line; $R_{board}$ represents a resistance value on a circuit board of the mobile terminal; $R_{bat}$ represents an inner resistance value of the battery, which can be experimentally measured; $V_{bat\_max}$ represents the maximum terminal voltage value supported by the battery, which shall be determined by a hardware platform on which the mobile terminal operates, and which shall be less than a specified safe value $V_{bat\_safe}$ of the terminal voltage of the battery; $I_{allow}$ represents the maximum safe charging current value selected while ensuring the safety of the battery being charged; and $\Delta I$ represents a preset difference in current, which preferably lies in the range of [150 mA, 250 mA]; and The reference table is created from the parameters $V_{bat\_real}$, $V_{out}$, $I_{targ}$ and $I_{max}$.

In this embodiment, in order not to measure $R_{line}$ and $I_{max}$, the sum of the resistance value $R_{line}$ on the charging line, and the resistance value $R_{board}$ on the circuit board of the mobile terminal can be calculated in the equation of:

$$R_{line}+R_{board}=(V_{out}-V_{bat})/I_{chg} \quad (4)$$

Where $V_{bat}$ represents the terminal voltage of the battery. That is, the terminal voltages $V_{bat}$ of the battery, and the charging currents $I_{chg}$, for the different target charging voltage values $V_{out}$ can be measured in reality, and substituted into Equation (4) to calculate the sum of $R_{line}$ and $R_{board}$, which is substituted into Equation (1) to calculate the target charging voltage value $V_{out}$.

In a preferred designed scheme of this embodiment, the target charging voltage value $V_{out}$ and the charging current maximum value $I_{max}$ corresponding to each interval $[x_{i1}, x_{i2}]$ can be calculated preferably as follows: a lower bound $x_1$ of the cell voltage in the interval is used as $V_{bat\_real}$ and substituted into Equation (1) to calculate the target charging voltage value $V_{out}$ corresponding to the interval; an upper bound $x_{i2}$ of the cell voltage in the interval is used as $V_{bat\_real}$ and substituted into Equation (3) to calculate the charging current maximum value $I_{max}$ corresponding to the interval; and further the target charging current value $I_{targ}$ is derived from calculated $I_{max}$ in Equation (2), and the reference table is created.

By way of an example, still taking the 4.2V chargeable battery as an example, for the system powered by the battery, from the perspective of the safety of voltage to power the device, the terminal voltage $V_{bat}$ of the battery shall not be more than a specific $V_{bat\_max}$ dependent upon the platform, and less than the specified safe value $V_{bat\_safe}$ of the terminal voltage of the battery. If the safe value $V_{bat\_safe}$ of the terminal voltage of the battery is $V_{bat\_safe}=4500$ mV, then $V_{bat\_max}=4470$ mV can be taken, so the terminal voltage $V_{bat}$ of the battery is $V_{bat}=V_{bat\_real}+I_{chg}*R_{bat}\le 4470$.

From the perspective of the safety of the battery, if the maximum safe charging current value is taken as $I_{allow}=4000$ mA, then the charging current maximum value $I_{max}$ is calculated as follows in Equation (3):

$$I_{max}=\min((4470-V_{bat\_real})/R_{bat}, 4000) \quad (5)$$

If the inner resistance $R_{bat}$ of the battery is $R_{bat}=100$ mΩ, the other impedance is $R_{line}+R_{board}=100$ mΩ, and the range delimited by the preset direct charging thresholds of the battery is [3500 mV, 4100 mV] at a step of 100 mV, then the range [3500 mV, 4100 mV] delimited by the direct charging thresholds can be divided into 6 intervals; an upper bound of the cell voltage in each interval is substituted into Equation (5) to calculate the charging current maximum value $I_{max}$; the target charging current value $I_{targ}$ is derived from calculated $I_{max}$ in Equation (2), and $\Delta I=200$ mA is taken in this embodiment; and a lower bound of the cell voltage in each interval is substituted into Equation (1) to calculate the target charging voltage value $V_{out}$ from calculated $I_{targ}$, so the desirable reference table is created as follows:

| $V_{bat\_real}$ (mV) | $V_{out}$ (mV) | $I_{targ}$ (mA) | $I_{max}$ (mA) |
|---|---|---|---|
| 3500-3600 | 4260 | 3800 | 4000 |
| ... | ... | ... | ... |
| 4000-4100 | 4700 | 3500 | 3700 |

The reference table reflects to some extent the correspondence relationship between the cell voltage of the battery, and the charging current and the charging voltage output by the adaptor, but there may be a minor error relative to the real correspondence relationship, so the battery can be experimentally charged, the charging voltage varying with different charging current is recorded, and the values of the parameters in the reference table are adjusted, for example, the values of the respective parameters in the reference table are adjusted to their ideal values by averaging them.

The target charging voltage obtained by looking up from the table is a theoretical value, and in reality, the inner resistance of the battery, and the impedance on the line may vary with temperature, aging, and other factors, so the real charging current value $I_{chg}$ output by the power source adaptor for charging directly may deviate to some extent from the target charging current value $I_{targ}$, thus resulting in some influence upon the charging speed. In order to raise the charging current as much as possible in an allowable range to further speed up charging, in this embodiment, a charging current self-adjusting algorithm is introduced at the power source adaptor for charging directly side, that is, after the power source adaptor for charging directly adjusts the output voltage to $V_{out}$, if $I_{targ}-I_e \leq I_{chg} < I_{targ}$, then $V_{out}=V_{out}+\Delta V$ is adjusted progressively so that the actual charging current value $I_{chg}$ output by the power source adaptor for charging directly approaches progressively the target charging current value $I_{targ}$.

In this embodiment, $V_{out}$ can be adjusted preferably for five times by an amount which can be estimated in Equation (1), and if $V_{bat\_real}$ and R (including the inner resistance of the battery, the line resistance, and all the other impedances) are invariable, then $\Delta V=\Delta I*R$. In this embodiment, $\Delta V$ is preferably set to $\Delta V=10$ mV.

In a second designed approach, a reference table of relationship between the cell voltage of the battery and the target charging voltage is preset at the power source adaptor for charging directly side, and the power source adaptor for charging directly searches the reference table using the received cell voltage (detected and provided by the mobile terminal) for the target charging voltage value corresponding to the cell voltage. Thereafter the power source adaptor for charging directly adjusts the output voltage thereof to the target charging voltage value to charge directly the battery built in the mobile terminal at large current.

Reference can be made for the related description in the first designed approach above for details about creating the reference table.

Particularly after entering the direct charging process, at the mobile terminal side, the microprocessor is timed to detect the cell voltage $V_{bat\_real}$ of the battery, communicates wirelessly with the power source adaptor for charging directly, and is timed to send the detected cell voltage $V_{bat\_real}$ to the power source adaptor for charging directly.

At the power source adaptor for charging directly side, the power source adaptor for charging directly searches the stored reference table thereof using the received cell voltage $V_{bat\_real}$, determines the cell voltage interval in which the cell voltage $V_{bat\_real}$ lies, and then searches using the determined interval for the target charging voltage value $V_{out}$, the target charging current value $I_{targ}$, and the charging current maximum value $I_{max}$ corresponding to the interval. Then the controller adjusts the resistance value of the valid resistor of the digital potentiometer to thereby change the charging voltage output by the AC-DC unit thereof to the target charging voltage value $V_{out}$. At the end of the adjusting, the power source adaptor for charging directly sends information E to the mobile terminal, and sends $I_{targ}$ and $I_{max}$ to the mobile terminal for detection of abnormal charging. At the same time the power source adaptor for charging directly monitors in real time the actual charging current value $I_{chg}$ output by the AC-DC unit, through the current monitoring chip thereof, and if $|I_{chg}-I_{targ}|>I_e$ or $I_{chg}>I_{max}$, then the power source adaptor for charging directly determines abnormal charging, disconnects the charging power source from being output, and stops the mobile terminal from being charged. If $|I_{chg}-I_{targ}| \leq I_e$ and $I_{chg} \leq I_{max}$, then the power source adaptor for charging directly ends this adjusting process.

Also the charging current self-adjusting algorithm described in the first designed approach above can be introduced at the power source adaptor for charging directly side so that the actual charging current value $I_{chg}$ output by the power source adaptor for charging directly can approach progressively the target charging current value $I_{targ}$ to thereby further speed up charging.

The table-lookup approach above relating to segmented constant-current-like charging can reduce the count of times that the output voltage of the power source adaptor for charging directly is adjusted, but the output voltage may be constant for a period of time, and the charging current will be decreasing gradually with the ever rising cell voltage of the battery, thus resulting in some influence upon the charging speed of the battery.

In order to enable the charging current to be maintained at a stable high level, direct charging control by following in real time the varying cell voltage is proposed in this embodiment as described in details in the following third designed approach.

In the third designed approach, the target charging voltage value is adjusted in real time by following dynamically the varying cell voltage of the battery.

Figure 7:
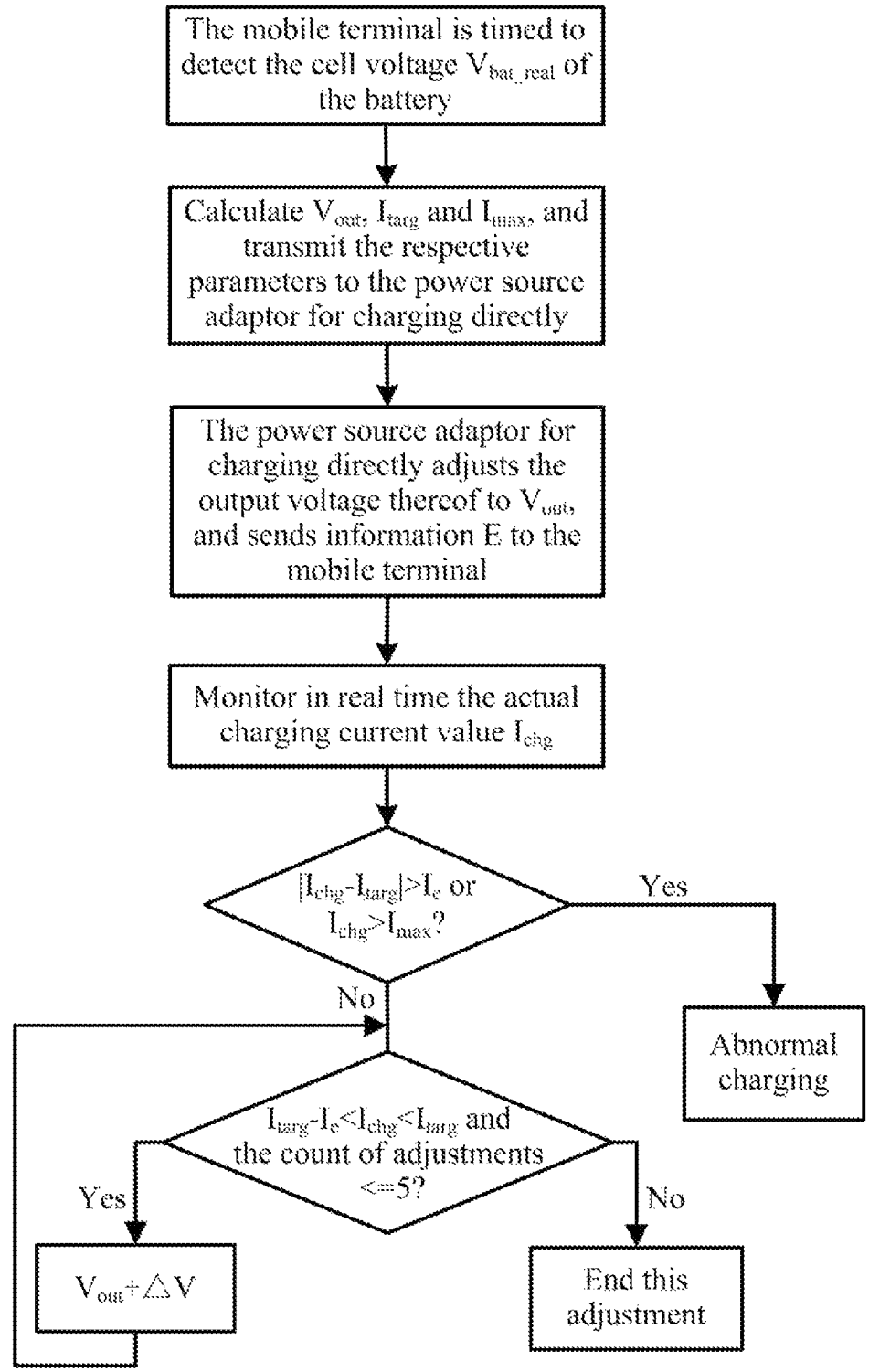
FIG. 7 is a flow chart of control in an embodiment of a voltage-following direct charging control strategy.

As illustrated in FIG. 7, after entering the direct charging process, the microprocessor in the mobile terminal is timed to detect the cell voltage $V_{bat\_real}$ of the battery, calculates the target charging voltage value $V_{out}$, the target charging current value $I_{targ}$, and the charging current maximum value $I_{max}$ in Equations (1) to (4), and sends these values wirelessly to the power source adaptor for charging directly.

The power source adaptor for charging directly adjusts the resistance value of the valid resistor of the digital potentiometer thereof according to the received target charging voltage value $V_{out}$ to thereby adjust the charging voltage output by the AC-DC unit to the target charging voltage value $V_{out}$. At the end of the adjusting, the power source adaptor for charging directly sends information E to the mobile terminal, and also monitors the charging current $I_{chg}$ output by the power source adaptor for charging directly, through the current monitoring chip, and if $|I_{chg}-I_{targ}|>I_e$ or $I_{chg}>I_{max}$, then the power source adaptor for charging directly determines abnormal charging, disconnects the charging power source from being output by the power source adaptor for charging directly to the outside, and notifies the mobile terminal of abnormal charging. If $|I_{chg}-I_{targ}| \leq I_e$ and $I_{chg} \leq I_{max}$, then the power source adaptor for charging directly ends this adjusting process, or starts the charging current self-adjusting algorithm above to finely adjust the charging voltage for at most five times (or another number of times), so that the actual charging current value $I_{chg}$ output by the power source adaptor for charging directly approaches progressively the target charging current value $I_{targ}$ to thereby speed up charging as much as possible.

S306. The mobile terminal determines whether the cell voltage of the battery exceeds the range delimited by the direct charging thresholds, and if not, then the flow returns to the step S305; otherwise, the flow proceeds to a subsequent step.

S307. The microprocessor controls the direct charging switch to be opened to disconnect the direct charging pathway, and instructs the power source adaptor for charging directly to adjust the output voltage thereof to the default constant charging voltage, e.g., 5V direct charging voltage, and to start the power source managing chip to receive the constant charging voltage to charge the battery at the constant voltage until the battery is fully charged.

In order to ensure the safety of the mobile terminal being charged, the following charging abnormality handling mechanism is proposed in this embodiment:

1. At the Mobile Terminal Side (1) The mobile terminal detecting that it is being powered by the power source adaptor for charging directly is timed to send a handshake instruction to the power source adaptor for charging directly, and waits for a preset period of time until the power source adaptor for charging directly feeds back response information, and if the mobile terminal receives the response information, then the handshake succeeds, and the mobile terminal is further charged; otherwise, the mobile terminal determines abnormal charging, disconnects the connection line between the charging interface of the mobile terminal and the system circuit, and notifies the user of the power source adaptor being abnormal;

(2) After entering the direct charging process, if the mobile terminal detects that the power source adaptor for charging directly is pulled out suddenly, then it disconnects the direct charging pathway between the charging interface of the mobile terminal and the battery, and has the charging interface connected with the power source managing chip;

(3) After entering the direct charging process, if the mobile terminal detects that the terminal voltage of the battery exceeds the preset threshold (the threshold of the terminal voltage of the 4.2V chargeable battery can be preset to 4.6V), then it disconnects the direct charging pathway between the charging interface of the mobile terminal and the battery, and instructs the power source adaptor for charging directly to be switched to the default constant charging voltage for output, e.g., 5V DC voltage;

(4) After entering the direct charging process, the mobile terminal monitors in real time the received actual charging current value $I_{chg}$, and if the absolute value of the difference between $I_{chg}$ and $I_{targ}$ goes beyond the preset controllable range of the difference, then it disconnects the direct charging pathway between the charging interface of the mobile terminal and the battery, and switches to the power source managing chip to charge the battery; and (5) After entering the direct charging process, the mobile terminal monitors in real time the received actual charging current value $I_{chg}$, and if $I_{chg}$ is more than $I_{max}$, then it disconnects the direct charging pathway between the charging interface of the mobile terminal and the battery, and notifies the user of the power source adaptor being abnormal 2. At the Power Source Adaptor for Charging Directly Side (1) The power source adaptor for charging directly obtaining the target charging voltage value $V_{out}$, the target charging current value $I_{targ}$, and the charging current maximum value $I_{max}$ monitors in real time its actual output charging current value $I_{chg}$, and if the absolute value of the difference between $I_{chg}$ and $I_{targ}$ goes beyond the preset controllable range of the difference, then the power source adaptor for charging directly stops the charging power source from being out, and flicks a lamp to alert the user;

(2) After entering the direct charging process, the power source adaptor for charging directly monitors in real time its actual output charging current value $I_{chg}$, and if $I_{chg}$ is more than $I_{max}$, then it determines abnormal charging, and disconnects the charging power source from being output to avoid the mobile terminal from being damaged due to being further powered.

The charging method according to this application can be widely applied to a cell phone, a tablet computer, a notebook computer, a mobile power source, and other mobile terminals so as to satisfy different charging demands of the user.

An embodiment of the application further provides a mobile terminal including a battery, a USB interface, a wireless communication module, a direct charging switch, a power source managing chip, and a microprocessor, where the battery is configured to store electrical energy; the USB interface is configured to be engaged with an external device; the wireless communication module is configured to transmit and receive a wireless signal; the microprocessor is configured, upon detecting an external device being inserted into the USB interface, to start the wireless communication module to search for devices which can communicate wirelessly therewith, if the devices include the external device connected with the USB interface, to determine that the external device is a power source adaptor for charging directly, and to be connected wirelessly with the power source adaptor for charging directly, if they are connected successfully, to exchange data with the power source adaptor for charging directly through the wireless communication module, to detect voltage of the battery, and if the voltage of the battery lies in a range delimited by preset direct charging threshold, to control charging voltage output by the power source adaptor for charging directly to charge the battery directly, and to determine from the current voltage of the battery the value of the charging voltage output by the power source adaptor for charging directly, and the microprocessor is further configured to output a switch control signal; and the direct charging switch is configured to control the mobile terminal to be switched between a charging mode in which the battery is charged through the power source managing chip, and a charging mode in which the battery is charged through the direct charging switch, in response to the switch control signal output by the microprocessor. In a real application, the mobile terminal according to the application can be embodied in the structure of the mobile terminal in FIG. 1.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A power source adaptor for directly charging a battery in a mobile terminal, the power source adaptor comprising:

a charging interface configured to externally connect with a mobile terminal, and comprising a power source pin and a ground pin;

an AC to DC converter configured to convert an AC input power source into a charging voltage required by the mobile terminal, and output the charging voltage to the mobile terminal via the charging interface;

a wireless communication module configured to wirelessly connect with the mobile terminal to transmit and receive one or more wireless signals; and a controlling unit connected with the wireless communication module, the controlling unit configured to start the wireless communication module and wait for it to be connected wirelessly with the mobile terminal after the AC to DC converting unit receives the AC input power source or the charging interface is connected with the mobile terminal, and after the wireless communication module and the mobile terminal are connected, exchange data with the mobile terminal through the wireless communication module, and adjust the charging voltage output by the AC to DC converter unit according to a current voltage of a battery in the mobile terminal.

2. The power source adaptor according to claim 1, wherein the wireless communication module is a Bluetooth module configured to, upon reception of a Bluetooth match code sent by the mobile terminal, feed the same Bluetooth match code back to the mobile terminal for matching; and after they are matched, receive a connection request from the mobile terminal to wirelessly connect with the mobile terminal, and exchange data with the mobile terminal after they are connected.

3. The power source adaptor according to claim 1, wherein:

the controlling unit is configured to receive a target charging voltage value from the mobile terminal through the wireless communication module, and adjust the charging voltage output by the AC to DC converter to the target charging voltage value according to the target charging voltage value; or the controlling unit is configured to receive a voltage of the battery from the mobile terminal through the wireless communication module, and if the voltage of the battery lies in a range delimited by preset direct charging thresholds, search a preset reference table using the voltage of the battery a target charging voltage value corresponding to the current voltage of the battery, feed the target charging voltage value to the mobile terminal, and adjust the charging voltage output by the AC to DC converter the target charging voltage value; or if the voltage of the battery falls out of the range delimited by the preset direct charging thresholds, control the AC to DC converter to output a default constant charging voltage.

4. The power source adaptor according to claim 3, wherein if the voltage of the battery lies in the range delimited by the preset direct charging thresholds, the controlling unit is configured to receive a target charging current value Itarg and a charging current maximum value Imax from the mobile terminal through the wireless communication module, or search the reference table for the target charging current value Itarg and the charging current maximum value Imax corresponding to the current voltage of the battery;

wherein the controlling unit is configured to detect a charging current Ichg output via the charging interface, and if Itarg−Ie≤Ichg<Itarg, control the AC to DC converter to progressively increase the charging voltage output by the AC to DC converter by a defined voltage ΔV, so that the charging current Ichg output via the charging interface approaches the target charging current value Itarg; or if the absolute value of the difference between Ichg and Itarg is more than Ie or Ichg is more than Imax, stop the charging voltage from being output to the charging interface; and wherein Ie represents a controllable range of the difference between the charging current value Itarg and the target charging current value Itarg.

5. The power source adaptor according to claim 1, wherein the AC to DC converter comprises a rectifying circuit, a transformer, a synchronous rectification controller, and a PWM controller, wherein the controlling unit comprises a controller and a digital potentiometer, wherein the rectifying circuit is configured to rectify the AC input power source into a DC power source and output the DC power source to the transformer for transformation into the charging voltage, wherein the controller is connected with the wireless communication module, wherein the controller is configured to wirelessly communicates with the mobile terminal through the wireless communication module, generate a voltage adjusting instruction from the charging voltage and sends the voltage adjusting instruction to the digital potentiometer to change a resistance value of a resistor of the digital potentiometer, wherein the digital potentiometer includes a resistor body connected in series with a current-limiting resistor, wherein the current-limiting resistor is connected between an anode of a secondary coil of the transformer and ground, wherein a central tap of the resistor body is connected with a reference voltage pin of the synchronous rectification controller, and wherein the synchronous rectification controller is configured to adjust a duty ratio of a PWM signal output by the PWM controller according to the varying resistance value of the resistor of the digital potentiometer and control a switching time of the transformer based on the PWM signal to adjust a value of the charging voltage output by the transformer.

6. The power source adaptor according to claim 2, wherein the AC to DC converter comprises a rectifying circuit, a transformer, a synchronous rectification controller, and a PWM controller, wherein the controlling unit comprises a controller and a digital potentiometer, wherein the rectifying circuit is configured to rectify the AC input power source into a DC power source and output the DC power source to the transformer for transformation into the charging voltage, wherein the controller is connected with the wireless communication module, wherein the controller is configured to wirelessly communicates with the mobile terminal through the wireless communication module, generate a voltage adjusting instruction from the charging voltage and send the voltage adjusting instruction to the digital potentiometer to change a resistance value of a resistor of the digital potentiometer, wherein the digital potentiometer includes a resistor body connected in series with a current-limiting resistor, wherein the current-limiting resistor is connected between an anode of a secondary coil of the transformer and ground, wherein a central tap of the resistor body is connected with a reference voltage pin of the synchronous rectification controller, and wherein the synchronous rectification controller is configured to adjust a duty ratio of a PWM signal output by the PWM controller according to the varying resistance value of the resistor of the digital potentiometer and control a switching time of the transformer based on the PWM signal to adjust a value of the charging voltage output by the transformer.

7. The power source adaptor according to claim 3, wherein the AC to DC converter comprises a rectifying circuit, a transformer, a synchronous rectification controller, and a PWM controller, wherein the controlling unit comprises a controller and a digital potentiometer, wherein the rectifying circuit is configured to rectify the AC input power source into a DC power source and output the DC power source to the transformer for transformation into the charging voltage, wherein the controller is connected with the wireless communication module, wherein the controller is configured to wirelessly communicates with the mobile terminal through the wireless communication module, generate a voltage adjusting instruction from the charging voltage and send the voltage adjusting instruction to the digital potentiometer to change a resistance value of a resistor of the digital potentiometer, wherein the digital potentiometer includes a resistor body connected in series with a current-limiting resistor, wherein the current-limiting resistor is connected between an anode of a secondary coil of the transformer and ground, wherein a central tap of the resistor body is connected with a reference voltage pin of the synchronous rectification controller, and wherein the synchronous rectification controller is configured to adjust a duty ratio of a PWM signal output by the PWM controller according to the varying resistance value of the resistor of the digital potentiometer and control a switching time of the transformer based on the PWM signal to adjust a value of the charging voltage output by the transformer.

8. The power source adaptor according to claim 4, wherein the AC to DC converter comprises a rectifying circuit, a transformer, a synchronous rectification controller, and a PWM controller, wherein the controlling unit comprises a controller and a digital potentiometer, wherein the rectifying circuit is configured to rectify the AC input power source into a DC power source and output the DC power source to the transformer for transformation into the charging voltage, wherein the controller is connected with the wireless communication module, wherein the controller is configured to wirelessly communicates with the mobile terminal through the wireless communication module, generate a voltage adjusting instruction from the charging voltage and send the voltage adjusting instruction to the digital potentiometer to change a resistance value of a valid resistor of the digital potentiometer, wherein the digital potentiometer includes a resistor body connected in series with a current-limiting resistor, wherein the current-limiting resistor is connected between an anode of a secondary coil of the transformer unit and the ground, wherein a central tap of the resistor body is connected with a reference voltage pin of the synchronous rectification controller, and wherein the synchronous rectification controller is configured to adjust a duty ratio of a PWM signal output by the PWM controller according to the varying resistance value of the resistor of the digital potentiometer and control a switching time of the transformer based on the PWM signal to adjust a value of the charging voltage output by the transformer.

9. The power source adaptor according to claim 5, wherein the AC to DC converter comprises an optical coupler and a power MOS transistor, wherein the optical coupler is connected with the synchronous rectification controller and the PWM controller, and configured to optic-electrically isolate a signal output by the synchronous rectification controller, wherein the power MOS transistor is connected between a cathode of the secondary coil of the transformer and the ground pin of the charging interface, and wherein the synchronous rectification controller is configured to control the power MOS transistor to switch on and off to rectify the charging voltage output by the transformer.

10. The power source adaptor according to claim 5, wherein the controlling unit comprises a current monitoring unit and a switch circuit, wherein the current monitoring unit is configured to monitor a charging current output in real time via the charging interface, and feed the charging current back to the controller, wherein the switch circuit is connected between the AC to DC converter and the charging interface, wherein the controller is configured to control the switch circuit upon detecting that the charging current Ichg is abnormal, and wherein the switch circuit is configured to disconnect a charging voltage transmission line between the AC to DC converter and the charging interface to stop the charging voltage from being output.

11. The power source adaptor according to claim 10, wherein the current monitoring unit comprises a current sampling resistor connected in series in the charging voltage transmission line, and a current monitoring chip connected in parallel with the current sampling resistor, and configured to monitor a difference in voltage across the current sampling resistor, amplify the difference in voltage, and output a sample voltage for transmission to the controller.

12. The power source adaptor according to claim 11, wherein the current monitoring unit comprises a bleeder circuit connected with the current monitoring chip, and configured to divide the sample voltage output by the current monitoring chip to adjust the sample voltage in an interface voltage range acceptable to the controller, and transmit the sample voltage to an ADC interface of the controller to detect a current value output via the charging interface.

13. The power source adaptor according to claim 10, wherein the switch circuit comprises a switch transistor and a boosting circuit, wherein the switch transistor is configured to support a large passing current, switch on and connect in the transmission line of the charging voltage, wherein the boosting circuit is connected with the controller, wherein the boosting circuit is configured, upon reception of a valid enable signal output by the controller, to output a higher switch voltage than a volt value of the charging voltage, and transmit the switch voltage to a control pole of the switch transistor to control the switch transistor to connect the transmission line of the charging voltage, and wherein, upon detecting that a current value output via the charging interface exceeds an allowable current range, the controller is configured to output an invalid enable signal to the boosting circuit, control the boosting circuit to stop the switch voltage from being output, and control the switch transistor to disconnect the transmission line of the charging voltage to stop the charging voltage from being output.

14. A mobile terminal, comprising:
a battery configured to store electrical energy;
a USB interface configured to engage an external device;
a wireless communication module configured to transmit and receive a wireless signal;
a microprocessor configured to start the wireless communication module to search for devices which can communicate wirelessly therewith upon detecting the external device is inserted into the USB interface, if the devices comprise the external device connected with the USB interface, determine that the external device is a power source adaptor for charging directly, and connected wirelessly with the power source adaptor, if the power source adaptor and the microprocessor are connected, exchange data with the power source adaptor through the wireless communication module, detect a voltage of the battery, if the voltage of the battery lies in a range delimited by preset direct charging thresholds, control a charging voltage output by the power source adaptor to charge the battery and determine from the current voltage of the battery the value of the charging voltage output by the power source adaptor, and output a switch control signal; and a direct charging switch configured to control the mobile terminal to be switched between a charging mode in which the battery is charged through a power source managing chip, and a charging mode in which the battery is charged through the direct charging switch, in response to the switch control signal output by the microprocessor.

\* \* \* \* \*